US012648577B2

(12) United States Patent
Becker et al.

(10) Patent No.: US 12,648,577 B2
(45) Date of Patent: Jun. 9, 2026

(54) METHOD FOR PRODUCING A MILK OR WHEY POWDER, AND USE OF A GERM-REMOVING SEPARATOR

(71) Applicant: GEA MECHANICAL EQUIPMENT GMBH, Oelde (DE)

(72) Inventors: Christian Becker, Leopoldshöhe (DE); Daniel Bussmann, Oelde (DE); Lennart Beick, Bielefeld (DE); Thomas Veer, Beesten (DE)

(73) Assignee: GEA Mechanical Equipment GmbH, Oelde (DE)

( * ) Notice: Subject to any disclaimer, the term of this patent is extended or adjusted under 35 U.S.C. 154(b) by 82 days.

(21) Appl. No.: 17/607,125

(22) PCT Filed: Mar. 24, 2020

(86) PCT No.: PCT/EP2020/058108
§ 371 (c)(1),
(2) Date: Oct. 28, 2021

(87) PCT Pub. No.: WO2020/221515
PCT Pub. Date: Nov. 5, 2020

(65) Prior Publication Data
US 2022/0202030 A1 Jun. 30, 2022

(30) Foreign Application Priority Data
Apr. 29, 2019 (DE) ..................... 10 2019 110 995.7

(51) Int. Cl.
A23C 21/00 (2025.01)
A23C 1/12 (2006.01)
A23C 7/04 (2006.01)

(52) U.S. Cl.
CPC ................. *A23C 21/00* (2013.01); *A23C 1/12* (2013.01); *A23C 7/046* (2013.01)

(58) Field of Classification Search
CPC ........... A23C 21/00; A23C 1/12; A23C 7/046; A23C 1/14; A23C 1/04
(Continued)

(56) References Cited

U.S. PATENT DOCUMENTS 3,058,833 A 10/1962 Simonart
5,518,751 A * 5/1996 de Boer .................. A23L 33/40
426/492
(Continued)

FOREIGN PATENT DOCUMENTS

EP 2679098 A1 1/2014
RU 2267274 C2 1/2006
(Continued)

OTHER PUBLICATIONS

"Canning of milk products," A Complete Course in Canning and Related Processes, (Fourteenth Edition) (Year: 2016).*
(Continued)

*Primary Examiner* — Jeffrey P Mornhinweg
(74) *Attorney, Agent, or Firm* — PATENT PORTFOLIO BUILDERS PLLC

(57) ABSTRACT
A method for producing a milk or whey powder, involves providing milk or whey, thickening the milk or whey using a first evaporation process or second evaporation process, and drying the thickened milk or whey to provide a milk or whey powder. After the first or second evaporation process, the milk or whey is sterilized using a centrifugal bacteria-removing separator.

16 Claims, 3 Drawing Sheets

(58) Field of Classification Search
USPC ........................................... 426/41, 580, 588
See application file for complete search history.

(56) References Cited

U.S. PATENT DOCUMENTS

| | | | |
|---|---|---|---|
| 6,780,450 B2 | 8/2004 | Bodenstab |
| 2003/0113425 A1 | 6/2003 | Bodenstab |
| 2014/0308417 A1 | 10/2014 | Adachi |
| 2016/0113302 A1 | 4/2016 | Zimmer |
| 2018/0084797 A1 | 3/2018 | Wiegers |

FOREIGN PATENT DOCUMENTS

| | | | |
|---|---|---|---|
| RU | 2582258 C2 | 4/2016 |
| WO | 2006066590 A1 | 6/2006 |

OTHER PUBLICATIONS

GEA; "Separators from GEA Westfalia Separator for Milk Clarifi-cation and Bacteria Removal;" BRO DA Bacteria Removal, Dec. 2012, en Tcm 11 27697.
International Search Report mailed Sep. 15, 2020 in related/corresponding International Application No. PCT/EP2020/058108.
Search Report created Nov. 13, 2019 in related/corresponding DE Application No. 10 2019 110 995.7.
Written Opinion mailed Sep. 15, 2020 in related/corresponding International Application No. PCT/EP2020/058108.
Office Action dated Jun. 8, 2023 in related/corresponding RU Application No. 2021129244.

* cited by examiner

Whole Milk — 101

Evaporation Process — 401

Homogenization — 900

Sterilization — 501

Evaporation Process — 601

Sterilization — 502

Drying — 701

Whole Milk Powder — 801

METHOD FOR PRODUCING A MILK OR WHEY POWDER, AND USE OF A GERM-REMOVING SEPARATOR

BACKGROUND AND SUMMARY OF THE INVENTION

Exemplary embodiments of the present invention relate to a method for producing a milk or whey powder, and to a use of a germ-removing separator.

According to the current prior art, a method is used for the production of powder from whole milk/skimmed milk/whey or similar products, in which the liquid basic product, a previously pasteurized milk or whey, which may be adjusted to a protein content, a protein/fat ratio or similar, is concentrated from the original dry matter content (abbreviated as DM in the following) (approx. 8% DM in the case of skimmed milk) or higher as in the case of whole milk (approx. 12% DM) to a solids content of 40-65% DM via evaporation of the liquid. The base material can be reduced in germ content prior to concentration via a germ-removing separator or germ-removing filtration in order to extend the service life of the evaporator. The resulting concentrate is then dried by a dryer to a powder with 96% DM for skimmed milk powder (SMP) and 97% for whole milk powder (WMP). The common method varies slightly and can be supplemented with pre-concentration and standardization of the protein content.

With the common evaporation processes, the content of thermoduric spore formers increases with the duration of a production. Particularly for powders with the quality requirement Low Thermo Spore Powder, a point is then reached after a short time at which production must be stopped and cleaning must be carried out in order to maintain the increased requirements for the subsequent powder quality. This makes the production process of Low Thermo Spore powder economically difficult because investments and operating expenses for sufficient plant capacity for continuous production or short production times must be accepted.

The service life of the evaporator varies depending on the process and product qualities. The following are examples of processes for the evaporation of milk.

Based on the foregoing, exemplary embodiments of the present invention are directed to making the method for producing a powdered milk product more process-efficient and, in particular, to increase the intervals between two cleaning cycles for cleaning the entire system.

A method of producing a milk or whey powder according to the invention comprises at least the following steps:

I. Providing milk, especially skimmed milk or whole milk, or whey

If the quality of the milk or whey is not sufficient with regard to the germs count, an initial sterilization in a germ-removing separator can already take place during preparation.

II. Thickening of the milk or whey by a first evaporation and/or a second evaporation Evaporation can take place in a so-called evaporation column. In addition to the DM content (dry substance content) of the milk or whey, the viscosity of the milk or whey also changes.

III. Drying of the thickened milk or whey to produce a milk or whey powder,

This step can be performed in a spray dryer, roller dryer or similar equipment.

According to the method of the invention, after the first or the second evaporation process, sterilization of the milk or whey is carried out by means of a centrifugal germ-removing separator. In particular, and especially preferably, sterilization can take place both after the first and after the second evaporation process.

Sterilization can be performed after the initial evaporation of the milk or whey. Sterilization at this point in the production of a powdered milk product reduces the intensity or frequency of cleaning of subsequent plant components.

The first and/or second evaporation process can be carried out in an evaporation column.

The germ-removing separator can be installed directly in the outlet of the evaporator column after the first or second evaporation process. In particular, disinfection by the germ-removing separator can take place both after the first and after the second evaporation process. Two germ-removing separators can also be used.

Sterilization can be efficiently performed by a single germ-removing separator.

For more efficient sterilization, sterilization can be carried out by at least two germ-removing separators connected in series. This can achieve a further reduction in the number of germs per gram of milk or whey.

The sterilization can alternatively be carried out by at least two germ-removing separators that are connected in parallel to each other. Each of the two germ-removing separators, in particular in parallel arrangement, can be designed in such a way that it can be cleaned separately by a clean-in-place (CIP) process.

Sterilization can advantageously be performed at a temperature between 45-65° C. This temperature range is optimal for setting the sterilization conditions.

Thickening of the milk or whey by a first evaporation process before sterilization can be carried out to a solids content of 16-26%, preferably between 18-24%. In this range, the germ-removing separator operates particularly efficiently.

Thickening can be done using a falling film evaporator or plate evaporator.

The sterilization of pre-concentrated dairy products can be carried out by means of a germ-removing separator with an upstream buffer tank.

In particular, an upstream buffer tank for buffering the feed volume can be arranged in the feed line of each germ-removing separator.

Furthermore, a downstream buffer tank for buffering the effluent volume can be arranged in the outlet of each germ-removing separator.

The buffer tanks decouple the germ-removing separator from the rest of the plant for the production of a powdered milk product with regard to pressure surges.

Further according to the invention is the use of a germ-removing separator for sterilizing a thickened milk or whey having a solids content of at least 14%, preferably having a solids content between 16-26%.

The germ-removing separator may have a disk pack with separator disks.

BRIEF DESCRIPTION OF THE DRAWING FIGURES

Several embodiment variants of the invention are explained in detail below with reference to several figures, wherein:

FIG. 4 shows a section of a plant for the production of milk powder.

DETAILED DESCRIPTION

The starting materials in the various embodiments of the present invention are liquid dairy products. In the embodiment variants described below, the liquid dairy products are skimmed milk 100, whole milk 101 or whey 102, in particular sweet whey.

In the production of milk powder, certain preconditions must be met for the starting materials.

Figure 1:
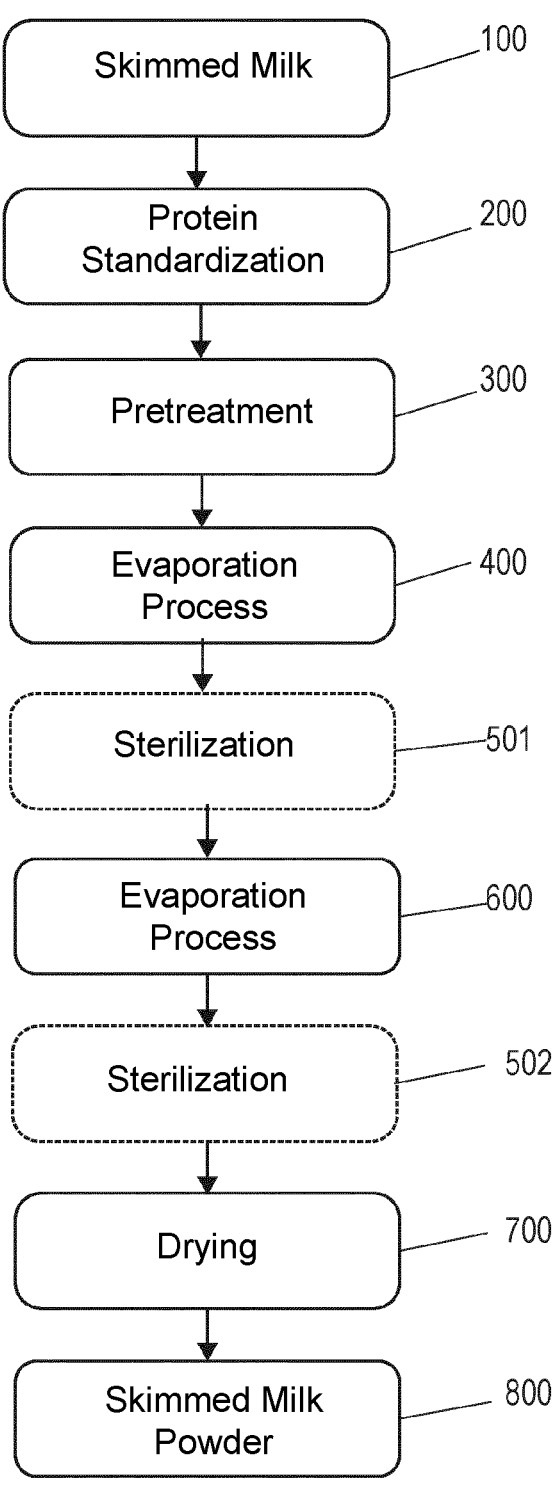
FIG. 1 shows a process schematic of a first embodiment variant of a method according to the invention.

FIG. 1 shows the processing of the starting product skimmed milk 100, which should preferably be further processed to skimmed milk powder in less than 48 h after milking. Storage between milking and processing according to the method of the invention can advantageously take place at a maximum of 5° C. The milk can be pretreated. This concerns centrifugal skimming or clarification and/or pasteurization.

The number of microorganisms per gram of milk should preferably be less than 50,000 colony forming units (CFU), particularly preferably less than 30,000 CFU. If the number of microorganisms is too high, the milk or skimmed milk can be sterilized before being used for the method according to the invention. This can be carried out by microfiltration or by a centrifugal germ-removing separator. Preferably, the milk used should be of Class A quality. The dry matter content of skimmed milk 100 is about 9% (+/−1%).

In a first optional step 200 of the method according to the invention, a protein standardization 200 may be performed. This can be carried out, for example, by ultrafiltration of skimmed milk, wherein either the retentate obtained or the permeate is mixed with further skimmed milk, depending on whether a skimmed milk with a higher or lower protein content is desired. This protein standardization serves, among other things, to set a homogeneous milk quality for further processing.

In a second, also optional step 300, pretreatment can be carried out, e.g., stabilization of skimmed milk. In this step, the skimmed milk 100 is heated. Depending on the composition of the skimmed milk, an optimum of a temperature/time combination can be determined by tests. For example, a temperature treatment in the range between 100 to 120° C. for 1-4 min has been found to be favorable. Subsequently, the milk can be cooled to a temperature higher than 50° C., preferably 65-75° C., and fed to the evaporator. This second step serves to improve the heat stability of the proteins contained in the skimmed milk, especially casein. Furthermore, some types of germs can be killed and a presetting of the temperature for the subsequent evaporator can be made.

In a third step 400, the milk is evaporated or thickened in an evaporator. This increases the viscosity and density of the skimmed milk. Preferably, circulation, falling film or plate evaporators can be used as evaporators. Evaporation takes place in two stages, with the third step 400 representing the first stage of evaporation. In this process, a concentrated skimmed milk with a dry matter of about 16-26% is obtained. Preferably, so-called evaporator columns can be used as evaporators.

This can then be fed in a fourth step 501 to a germ-removing separator for centrifugal sterilization. The germ-removing separator or separators are designed as centrifugal disk separators, which are operated as clarifiers. Impurities in the milk/whey, such as undesirable spores, germs and/or bacteria, are reliably separated.

The milk temperature of the concentrated skimmed milk may be more than 40° C., preferably 50 to 60° C.

The drum must be provided with the maximum possible clarifying area. The recirculation line used on the germ-removing separators returns a certain amount of concentrate (entrained liquid) to the skimmed milk flowing to the separator. This entrained liquid consists of an intermediate phase between the light, clarified milk phase and the heavy solids phase. The continuous flow of the entrained liquid in the disk pack promotes the sterilization effect.

Preferably, the drum solids space can be emptied discontinuously so that impurities together with the bacteria can be removed from the drum.

The germ-removing separator is adapted for sterilization of highly viscous and denser dairy products.

Compared to a degerminator for milk, which is known per se, the feed capacity is reduced for highly viscous and denser milk products.

It is also possible and preferred to arrange two or more germ-removing separators in parallel after the evaporator.

FIG. 4 shows a section of a plant 1 for the production of milk or whey powder. This plant 1 is merely an example and can be supplemented in particular by further evaporation columns and/or germ-removing separators.

A germ-removing separator 2 is thereby arranged in an evaporator 4 with several evaporator columns 5. The separator 2 can preferably be installed in the inlet of the next evaporator column or the outlet of the previous evaporator column 5 of step 400 for further processing. In the germ-removing separator 2, centrifugal forces are then used to separate the microorganisms present, including the thermoduric spore formers.

For more efficient bacteria removal, an additional germ-removing separator can optionally be connected in series with germ-removing separator 2. This can achieve a further reduction in the number of germs per gram of milk or whey.

In order to ensure sterilization over the entire period, a second germ-removing separator can be installed as an option, which can be integrated into the process as an alternative to the first separator if required (parallel). In parallel operation, the first separator can be cleaned during this time via a separately installed CIP supply.

In order to be able to decouple the evaporators, or the concentration equipment if necessary, from the separators in the event of pressure surges and the like, and to keep the flow constant if required, a buffer vessel 3 can be installed in the inlet and/or outlet of the separator 2 or separators, as shown in FIG. 4.

In a modification of FIG. 4, one buffer vessel in the inlet and one in the outlet for each separator and/or one buffer vessel each in the inlet and outlet for both separators can be planned.

Furthermore, a buffer tank 6 can be arranged on the inlet side of the arrangement 4 consisting of several evaporator columns 5.

After a first sterilization 501, a further evaporation 600 can be performed. For this purpose, the thickened milk can be fed to a second evaporator column or returned to the evaporator from step 400. A thickened skimmed milk with a dry matter content of up to 50% can be obtained by the second evaporation.

After the second evaporation 600, a second sterilization 502 can follow. This second sterilization 502 can be performed in the same way as the first sterilization 501. The second sterilization 502 can further reduce the bacterial count.

Within the scope of the present invention, it is also possible to carry out the first and second evaporations first and only then to carry out sterilization.

Finally, in a further step 700, drying is carried out. This drying can be carried out, for example, by spray drying. In this process, milk may be fed from a product feed tank or directly from the evaporator or degerminator to an atomizing device. This atomizing device may be part of an air distributor in the upper part of a drying tower. Finely atomized droplets then meet hot air in the drying tower and evaporation takes place with simultaneous air cooling. Most of the dried milk powder falls into the lower part of the drying tower and can already be cooled at this point by an appropriate cooling system.

The product is skimmed milk powder. The residual moisture of this skimmed milk powder is about 4% (+/− 0.2%). Preferably, the product is a skimmed milk powder having a plate count of thermophilic spores (113 F to 158 F) of less than 100 cfu/g, more preferably less than 50 cfu/g. The aforementioned skimmed milk powder may be referred to as a "low thermospore" powder. Normal skimmed milk powder may have a plate count of thermophilic spores of up to 1000 cfu/g.

Typically, the production of a skimmed milk powder with the aforementioned plate count, for example according to a method sequence as described in US 20160113302 A1, requires cleaning of the evaporator at short intervals. Due to the sterilization in the evaporator process, a plant for the production of milk powder can be operated in the production mode for a considerably longer time and the cleaning mode only needs to be activated at longer intervals.

By using the germ-removing separators in the evaporation process, the quality of the final products (e.g., skimmed milk powder) can be guaranteed with a significant increase in production time.

Figure 2:
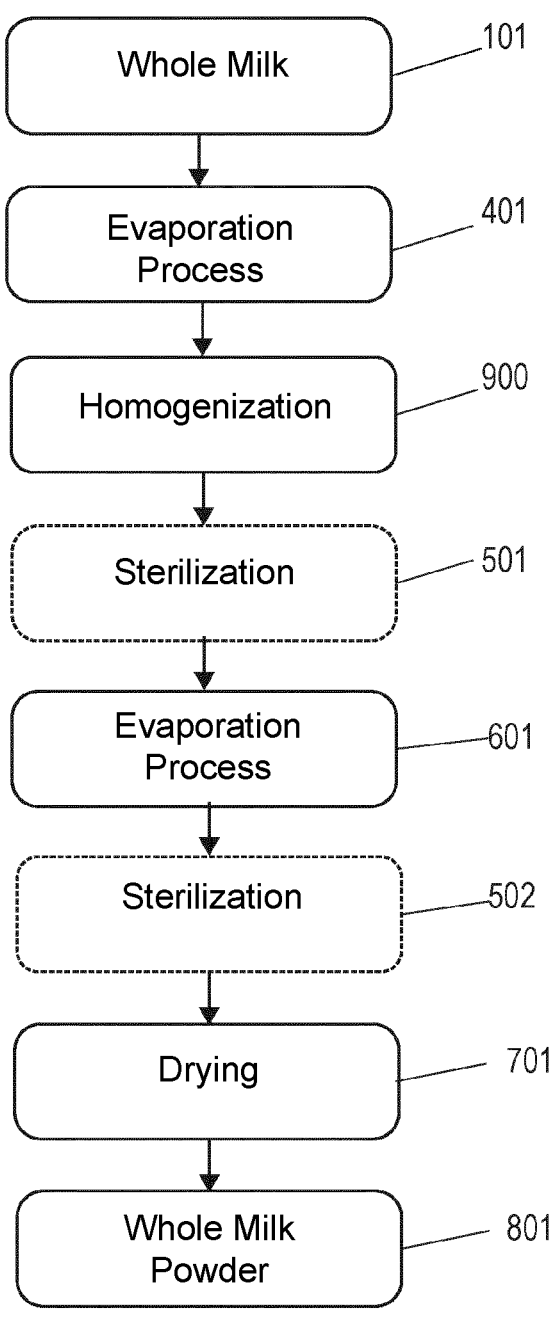
FIG. 2 shows a process schematic of a second embodiment variant of a method according to the invention.

FIG. 2 shows the processing of the starting product whole milk 101, which should also preferably be further processed into whole milk powder 801 less than 48 h after milking. Storage between milking and processing according to the method of the invention can advantageously take place at a maximum of 5° C. The milk can be pretreated. This concerns centrifugal skimming or clarification, standardization of the fat content by separation of fat or addition of skimmed milk and/or pasteurization.

The number of bacteria per gram should preferably be less than 50,000, particularly preferably less than 30,000. If the number of bacteria is too high, the whole milk can be sterilized before being used for the method according to the invention. This can be done by microfiltration or by a centrifugal germ-removing separator. Preferably, the milk used should be of Class A quality. The dry matter content of whole milk is about 12% (+/−1%).

The whole milk 101 can be subjected directly to an evaporation 401 for the purpose of thickening. In this process, the whole milk 101 can be fed to an evaporation column in a manner analogous to the treatment of skimmed milk 100. Thereby, a concentrated whole milk with a dry matter of up to 28% is obtained.

Following the first evaporation 401, a homogenization 900 of the milk may take place.

After homogenization 900, sterilization 501 can be performed. The sterilization can be carried out analogously to the aforementioned embodiment. Thus, sterilization with a single germ-removing separator is advantageous as single sterilization, but double sterilization with two germ-removing separators connected in series can also be carried out.

After a first sterilization 501, a second evaporation process 601 can be performed. For this purpose, the thickened and sterilized whole milk can be fed to a second evaporation column or returned to the evaporation column from step 401. Through the second evaporation process, a thickened whole milk with a dry matter content of up to 50% can be achieved.

Optionally, after this second evaporation, a repeated sterilization 502 can be performed.

Finally, the thickened and sterilized whole milk can be fed to a drying unit, e.g., a spray dryer, for drying 701. In this process, the thickened whole milk is converted into whole milk powder. The residual moisture of whole milk powder is about 2.5% (+/−0.2%).

Figure 3:
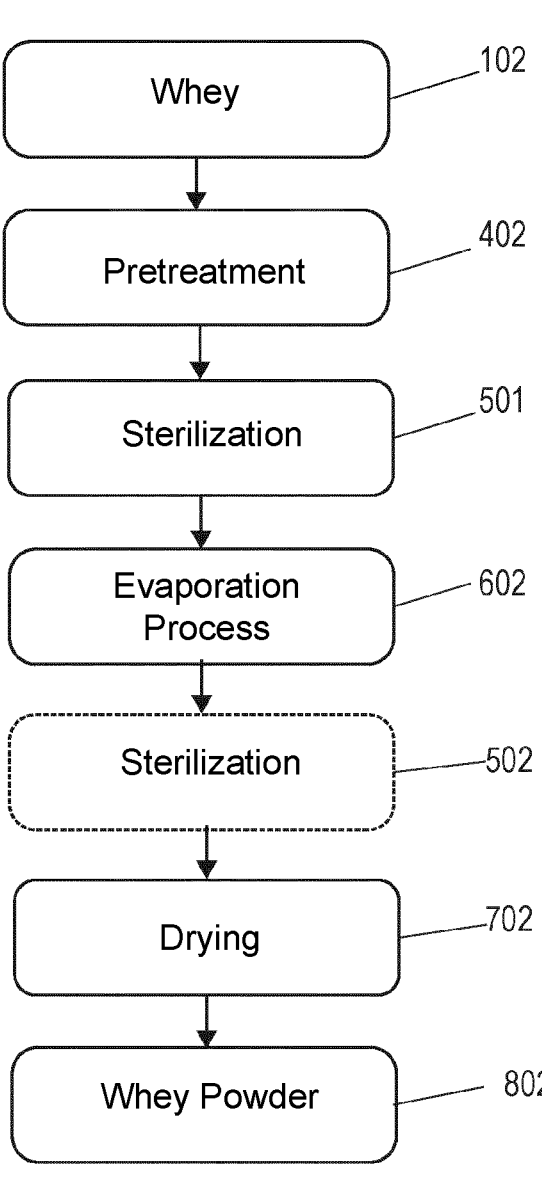
FIG. 3 shows a process schematic of a third embodiment variant of a method according to the invention.

FIG. 3 shows the processing of sweet whey 102 into sweet whey powder 802.

In the case of sweet whey 102, it should preferably come from the production of cheese, which was made from fresh cow's milk and without additives.

A short storage time of less than 1 h is preferred, provided that the whey is stored at a temperature of more than 10° C. between cheese production and further processing into whey powder. At temperatures below this, the maximum storage time is 10 h. The dry matter content of sweet whey is approx. 6% (+/−1%).

In a first step, the sweet whey can be thickened by an evaporation process 402. This thickening can be carried out analogously to the embodiment variant of FIG. 1. The dry matter content of the thickened sweet whey is up to 26%.

Then a sterilization 501 is carried out in a germ-removing separator. This sterilization can be performed as single sterilization or double sterilization.

A further evaporation process 602 then takes place so that the thickened sweet whey has a dry matter content of up to 50%.

Optionally, after this second evaporation process, a repeated sterilization 502 can be performed.

Finally, the thickened sweet whey is dried 702 to a sweet whey powder with a residual moisture content of about 4% (+/−0.2%) based on the weight of the powder.

In the methods shown in FIGS. 1-3, the production lines are supplemented by at least one germ-removing separator, preferably two germ-removing separators connected in parallel or in series, which are designed for the sterilization of highly viscous and denser dairy products.

In this case, the sterilization takes place after a step of evaporation. Preferably, one or more germ-removing separators can take place after an evaporation column of a first evaporation step or thickening step 400, 401, 402. For example, at least one germ-removing separator may be installed in the feed of an evaporation column of a second evaporation step 600, 601, 602 or in the outlet of the evaporation column of the second evaporation step 600, 601, 602.

The installation of a germ-removing separator after the evaporator column of the first evaporation step 400, 401, 402 is considered to be particularly advantageous in this respect, in which the product with a dry matter of about 16-26%, preferably 18-24% DM is pumped from the evaporator into the germ-removing separator.

In the germ-removing separator, centrifugal forces are then used to separate the microorganisms present, including the thermoduric spore formers.

In order to achieve a further reduction in the number of germs per gram of milk or whey, another germ-removing separator can optionally be connected in series with germ-removing separator 2.

In order to ensure sterilization over the entire period, a second germ-removing separator is installed, which can be integrated into the process as an alternative to the first separator (parallel connection) if required. In the case of a parallel connection, the first separator can be cleaned during this time via a separately installed CIP supply.

In order to decouple the evaporators or the concentration equipment from the germ-removing separators for pressure surges and the like, and to keep the flow constant as far as required, buffer tanks 3 can be installed in the inlet and outlet of the separators. For each separator, one buffer tank can be installed in the inlet and one in the outlet, as well as one buffer tank each in the inlet and outlet for both separators.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

100 Skimmed milk
101 Whole milk
102 Whey
200 Protein standardization
300 Pretreatment
400 Evaporation process
401 Evaporation process
402 Pretreatment
501 Sterilization
502 Sterilization
600 Evaporation process
601 Evaporation process
602 Evaporation process
700 Drying
701 Drying
702 Drying
800 Skimmed milk powder
801 Whole milk powder
802 Whey powder
900 Homogenization
1 Plant
2 Germ-removing separator
3 Buffer tank
4 Evaporator
5 Evaporation column
6 Buffer tank

The invention claimed is:

1. A method for producing a milk or whey powder, the method comprising:
   providing milk as skimmed milk, whole milk, or whey;
   determining the skimmed milk, whole milk, or whey has a number of bacteria per gram equal to or greater than 50,000 colony forming units;
   sterilizing, using a centrifugal germ-removing separator, the skimmed milk, whole milk, or whey responsive to the determining the skimmed milk, whole milk, or whey has a number of bacteria per gram equal to or greater than 50,000 colony forming units;
   thickening the skimmed milk, whole milk, or whey by a first evaporation process and a second evaporation process, wherein the first and second evaporation processes are performed in a respective evaporation column;
   sterilizing, using the centrifugal germ-removing separator after the first evaporation process and before a second evaporation process, the thickened skimmed milk, whole milk, or whey to produce sterilized, thickened skimmed milk, whole milk, or whey; and
   drying the sterilized, thickened skimmed milk, whole milk, or whey to provide a milk or whey powder.

2. The method of claim 1, wherein the sterilized, thickened skimmed milk, whole milk, or whey is further thickened in the second evaporation process to a dry matter content of less than 50%.

3. The method of claim 1, further comprising:
   receiving, by the germ-removing separator installed directly in an outlet of the evaporation column of the first or second evaporator process, the thickened skimmed milk, whole milk, or whey.

4. The method of claim 1, wherein the sterilization is performed using a single germ-removing separator, and wherein the drying comprises drying the sterilized, thickened skimmed milk, whole milk, or whey produced by the single germ-removing separator.

5. The method of claim 1, wherein the centrifugal germ-removing separator comprises first and second centrifugal germ-removing separators, wherein the sterilizing comprises:
   sterilizing, using the first centrifugal germ-removing separator, the thickened skimmed milk, whole milk, or whey to produce sterilized, thickened skimmed milk, whole milk, or whey; and
   further sterilizing, by the second centrifugal germ-removing separator, the sterilized, thickened skimmed milk, whole milk, or whey produced by the first centrifugal germ-removing separator.

6. The method of claim 1, wherein the centrifugal germ-removing separator comprises first and second centrifugal germ-removing separators, the method further comprising:
   providing, by the evaporator column of the first or second evaporation process in parallel to each other, the thickened skimmed milk, whole milk, or whey.

7. The method of claim 6, wherein each of the first and second centrifugal germ-removing separators are arranged in such a way that each of the first and second centrifugal germ-removing separators can be cleaned separately by a clean-in-place process, the method further comprising:
   separately cleaning the first and second centrifugal germ-removing separators using a clean-in-place process.

8. The method of claim 1, wherein the thickening is performed using a falling film evaporator.

9. The method of claim 1, wherein the sterilization is performed using the centrifugal germ-removing separator with an upstream buffer tank.

10. The method of claim 1, further comprising:

buffering, by a buffer tank arranged upstream in a feed of the centrifugal germ-removing separator, a feed volume of the centrifugal germ-removing separator.

11. The method of claim 1, further comprising:

buffering, by a buffer tank arranged downstream of and coupled to an outlet of the centrifugal germ-removing separator, an effluent volume output via the outlet of the centrifugal germ-removing separator.

12. The method of claim 7, wherein the sterilization is performed at a temperature between 45-65° C. and the thickening of the skimmed milk, whole milk, or whey by the first evaporation process is performed to a solids content of 16-26%.

13. A method for producing a whey powder, the method comprising:

thickening whey using a first evaporation column by a first evaporation process to achieve a solids content of the thickened skimmed milk, whole milk, or whey of 16-26%;

after the first evaporation process, sterilizing, using a centrifugal germ-removing separator at a temperature between 45-65° C., the thickened whey to produce sterilized, thickened whey;

thickening the sterilized, thickened whey using a second evaporation column to produce sterilized, further thickened whey having a dry matter content of up to 50%; and sterilizing the sterilized, further thickened whey and then drying the sterilized, further thickened whey to provide the whey powder.

14. The method of claim 1, wherein the milk or whey powder is a low thermospore powder.

15. The method of claim 13, wherein the whey powder is a low thermospore powder.

16. A method for producing a milk powder, the method comprising:

storing, after milking, milk;

receiving and pasteurizing the stored milk;

sterilizing, using a centrifugal germ-removing separator, the milk, so that the sterilized milk has a number of bacteria per gram equal to or less than 30,000 colony forming units;

thickening the pasteurized the milk in a first evaporation column in a first evaporation process to achieve thickened whole or skimmed milk with a solids content of the thicken whole or skimmed milk of 16-26%;

sterilizing, using the centrifugal germ-removing separator after the first evaporation process, the thickened milk to produce sterilized, thickened milk;

further thickening the sterilized, thickened milk in a second evaporation column in a second evaporation process to provide sterilized, further thickened milk having a dry matter content of up to 50%; and drying the sterilized, further thickened milk to provide the milk powder.

\* \* \* \* \*